United States Patent Office 2,971,375
Patented Feb. 14, 1961

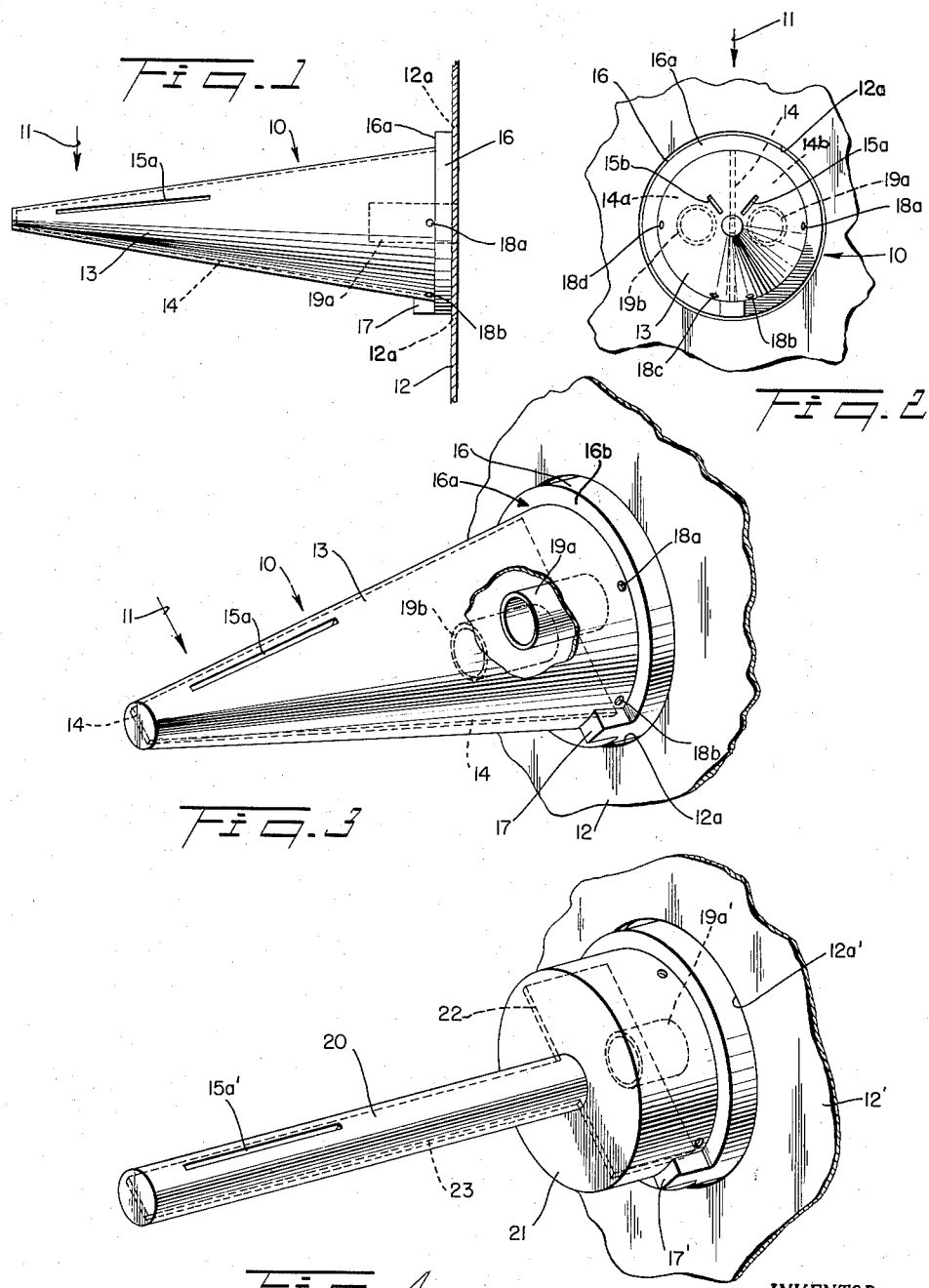

2,971,375

AIRSTREAM DIRECTION DETECTOR PROBE

Ivan O. Fieldgate, Halesite, N.Y., assignor to Specialties, Inc., Syosset, N.Y., a corporation of New York Filed Sept. 21, 1959, Ser. No. 841,172

6 Claims. (Cl. 73—180)

This invention relates to instruments for detecting the direction of airstream.

Instruments have been devised for detecting the direction of an airstream, such instruments being widely used to indicate angle of attack and angle of side slip of aircraft and missiles. Generally speaking, there are two basically different types of such instruments. One utilizes a vane which is rotatable on an eccentric axis and which is driven by the airstream to an angular position of equilibrium which represents airstream direction. The second type utilizes a pneumatic probe rotatable about its own axis having a pair of circumferentially spaced, forward-facing ports, which are so connected in a pneumatic servo loop that the probe is brought to an angular position at which ports sense substantially equivalent pressures on opposite sides of the stagnation line, normally the leading edge of the probe. The latter type of instrument has several advantages over the vane type including better balancing characteristics, lower air friction, greater sensitivity, and less tendency to flutter or otherwise yield erroneous readings under adverse flying conditions. Also, it requires less power to prevent ice accumulations on a probe than a vane. It is, however, characteristic of pneumatic probes to receive moisture through the ports, and in most cases means must be formed to keep the moisture out of the internal mechanism of the instrument.

It is, therefore, an object of the present invention to provide a new and improved probe design which retains all of the characteristic advantages of pneumatic probes for airstream detector instrument and which, in addition, protects the internal parts of the instrument against the ingress of moisture under virtually all conditions.

In accordance with the present invention, there is provided a probe which is rotatable about its longitudinal axis and which extends laterally into the airstream. In one preferred arrangement in accordance with the invention, the geometry of the probe is conical, convergent toward the free or outer end. Elongated entry ports for the pneumatic signals are arranged in the conical surface, preferably in planes containing the axis of the probe so that the ports also converge moving outwardly toward the free end, and the space within the cone is divided by a partition. Small drain holes are located in the base of the cone with their edges tangential with the inside floor thereof. Externally, there is provided an annular shoulder and a projecting ridge closely adjacent the drain holes to wet the holes externally. Access to the internal mechanism of the instrument from the base of the probe is provided through a pair of ducts, which extend outward into the cone and which are clustered near the center axis so as to be spaced a substantial distance from the inner walls.

In operation, water droplets on the probe will encounter an expanding passage which tends to break up the droplets to leave a clear air path. Also, wetting the outside of the holes breaks the surface tension and permits the passage of water out through drain holes of externally small size. Any water which enters the probe will, therefore, find its way out of the drain holes, which will normally have water on their outside surfaces, due to the proximity of the ridge located adjacent the drip ring. The conical configuration, in addition, affords improved weight distribution and strength, as well as reduced internal pneumatic resistance, without loss of sensitivity and other advantageous aerodynamic features.

The above and other objects and features of the present invention will be apparent from the following specification describing preferred embodiments thereof and taken in conjunction with the accompanying drawing in which:

Figure 1 is a side view of a pneumatic probe rotatable about its axis and mounted in a surface of an aircraft to extend laterally into the airstream;

Figure 2 is an end view of the probe of Figure 1;

Figure 3 is a view in perspective and partly broken away of the probe of Figures 1 and 2; and Figure 4 is a view in perspective of a modified form of the probe, which is similarly mounted in an aircraft.

Referring to the drawings, the invention is illustrated, in Figures 1 through 3, as embodied in a tubular probe assembly indicated generally by the numeral 10, which is mounted in an aircraft to extend laterally into the airstream, the general direction of which is indicated by the arrow 11. The probe assembly 10 is mounted by means which are not the concern of the present invention to rotate about its longitudinal axis, and to this end, the assembly projects through an opening 12a in the skin 12 of the aircraft.

The probe assembly 10 includes a hollow conical portion 13, the walls of which converge, moving outwardly toward the free end. Internally, the hollow cone is divided in equal parts by a generally triangular, internal partion or separator 14. Thus, the two halves of the cone are pneumatically isolated, and there are established two pneumatic conduits 14a and 14b extending axially along the length of the probe.

Formed in the conical wall are a pair of pneumatic ports 15a and 15b, which in the illustrated arrangement take the form of elongated slots which are also convergent, moving toward the free end of the probe. The ports 15a and 15b open into the spaces on opposite sides of the dividing partition 14. The ports are also circumferentially spaced apart by a predetermined amount, substantially less than 180°, so that each presents itself to the airstream on opposite sides of the stagnation line which is the imaginary line along the surface of the probe which faces directly into the airstream. The instrument automatically seeks a balance point at which the pneumatic pressures are equal in the two ports. Typical instruments of this type are disclosed U.S. Patents Nos. 2,445,746 and 2,701,473.

The hollow conical portion 13 connects to a base 16 having a wall 16a extending transversely of the axis of the probe to terminate the longitudinal conduits 14a and 14b. The base wall 16a is of slightly larger radial dimension than the base diameter of the tubular or conical portion to define an annular shoulder 16b, which functions as a drip ring. The drip ring 16b is interrupted by a barrier element 17 extending outwardly in the direction of the axis of the probe and butting tightly against the proximate, conical surface. Piercing the conical wall closely adjacent the drip ring 16b are a series of drain apertures or holes 18a, 18b, 18c, and 18d, communicating with the internal conical chamber, or more particularly the pneumatic conduits 14a and 14b therein. The holes 18a and 18b communicate with the chamber on one side of the partition 14 and the holes 18c and 18d with the chamber on the other side of the partition. The holes 18a and 18d are spaced apart by approximately 180°, and the holes 18b and 18c are disposed closely adjacent the barrier 17.

Connecting with the conical chamber on opposite sides of the barrier 14 are a pair of, extending outwardly in cantalever fashion, air ducts 19a and 19b, the former being in direct communication with the port 15a and the latter with the port 15b. The ducts 19a and 19b communicate with the internal mechanism of the instrument wherein a pneumatic servo loop is completed, all as described in said U.S. Patents Nos. 2,445,746 and 2,701,473, to cause the probe assembly 10 to be rotated until substantially equivalent pressures occur on opposite sides of the barrier 14, at which time airstream direction will be as indicated by the direction arrow 11.

Referring to Figure 4, there is illustrated a portion of an airstream direction detecting instrument, which is generally similar to that of Figures 1 through 3, and in which like parts are identified by like, primed reference numerals. The instrument includes a more conventionally shaped cylindrical probe 20 terminating at its inner end in an enlarged tubular portion 21 and divided by a partition or separator 22, which includes an extension 23, bisecting the tubular portion 21. In this fashion a pneumatic channel is formed from the inlet port 15a' to the pneumatic duct 19a'. A similar and duplicate arrangement occurs with respect to the port and duct on the opposite side of the partitions 22 and 23, these elements not being visible, however, in Figure 4.

In operation, water droplets which might appear in the probe 13 move so that they bridge an expanding passage, causing the droplets to break up and leave a clear air path. Also, water on the outside of the drain holes 18a—18d causes the surface tension to break to permit the passage of water outwardly through the holes, even though they are of extremely small diameter, such for example as .125 inch or less. Water is prevented from entering the instrument itself by the outwardly extending duct portions 19a and 19b. The drip ring or shoulder 16a is tangential with the drain holes and retains droplets of rain which run down the outside of the probe. The two drain holes 18b and 18c are located in the back edge of the partition 14, and, in order to hold up a droplet on the outside when the probe is generally horizontal, the barrier 17 is disposed at this point between the drain holes, thereby assuring wetting.

While the invention has been described above having reference to preferred embodiments thereof, it will be apparent that it can take various other forms and arrangements. The invention should not, therefore, be regarded as limited, except as defined in the accompanying claims.

I claim:
1. In apparatus for sensing the direction of an airstream, a probe assembly adapted to project laterally into the airstream and to be rotated about its projecting axis to angular positions indicative to airstream direction, comprising a tubular member, means defining at least a pair of internal pneumatic conduits extending along the length thereof, and means defining at least a pair of inlet ports in the wall of the tubular member at circumferentially spaced points and communicating respectively with the internal conduits, a base portion including a radially extending shoulder exceeding the dimensions of the base of the tubular member to define a drip ring for water, and means forming a plurality of drain apertures in the tubular member closely adjacent the shoulder, said apertures communicating with the pneumatic conduits of the tubular member, and duct means communicating with the pneumatic conduits to pass pneumatic signals.

2. In an instrument for sensing the direction of an airstream, a tubular probe member adapted to project laterally into the airstream and rotatable about its projecting axis, said member being substantially circular in cross section, a base support for the tubular member comprising a wall disposed transversely with respect to the axis of the tubular member and closing its inner end, a radially extending shoulder at the base of the tubular member, the dimensions of which exceed the diameter of the tubular member, and defining a drip ring for water, said tubular member having formed therein at least a pair of internal pneumatic conduits, extending along the length thereof, each terminating at said base wall, means defining a pair of circumferentially spaced-apart inlet ports in the tubular member, the spacing being less than 180° and the ports communicating respectively with said pneumatic conduits, a pair of pneumatic ducts projecting from said base into said conduits in cantalever fashion and being of substantially smaller size and spaced from the proximate walls thereof, and a circumferentially arrayed series of drain apertures piercing the tubular member closely adjacent said radial shoulder and communicating with said conduits closely adjacent said base wall and disposed inwardly of the free ends of said cantalever ducts.

3. Apparatus as set forth in claim 2 including a barrier ridge extending outwardly from said radial shoulder in the direction of the axis of the probe to block the passage of moisture, at least two drain apertures being disposed at the intersection of the barrier and the radial shoulder.

4. Apparatus as set forth in claim 2, said tubular member being hollow and a central partition dividing the tubular member into two internal portions, thereby to define said pneumatic conduits, and a barrier ridge projecting outwardly from the radial shoulder in the direction of the axis of the probe and disposed substantially in the plane of said partition, said barrier ridge abutting against the tubular member and being disposed on the opposite side of the tubular member from said pneumatic inlet ports.

5. Apparatus as set forth in claim 4, said tubular member being substantially conical with its walls converging moving outwardly toward the free end thereof.

6. Apparatus as set forth in claim 5, said drain apertures including a pair of apertures disposed respectively in the plane perpendicular to said partition and passing through the axis of the tubular member, said pneumatic ports being formed in the outer portion of the tubular member and converging toward the free end thereof.

References Cited in the file of this patent

UNITED STATES PATENTS

| | | |
|---|---|---|
| 2,832,217 | Hamren | Apr. 29, 1958 |
| 2,834,208 | Westman | May 13, 1958 |

FOREIGN PATENTS

| | | |
|---|---|---|
| 685,292 | Great Britain | Dec. 31, 1952 |